United States Patent
Cho et al.

(10) Patent No.: US 9,117,569 B2
(45) Date of Patent: Aug. 25, 2015

(54) OPTICAL FIBER COMPOSITE CABLE

(71) Applicant: LS Cable & System Ltd., Anyang-si, Gyeonggi-do (KR)

(72) Inventors: Chang-Eun Cho, Uiwang-si (KR); Chan-Yong Park, Gunpo-si (KR); Jae-Bok Lee, Seongnam-si (KR)

(73) Assignee: LS CABLE & SYSTEM LTD., Anyang-si, Gyeonggi-do (KR)

( * ) Notice: Subject to any disclaimer, the term of this patent is extended or adjusted under 35 U.S.C. 154(b) by 0 days.

(21) Appl. No.: 14/196,456

(22) Filed: Mar. 4, 2014

(65) Prior Publication Data

US 2014/0254994 A1     Sep. 11, 2014

(30) Foreign Application Priority Data

Mar. 5, 2013  (KR) .......................... 10-2013-0023143

(51) Int. Cl.
*G02B 6/44* (2006.01)
*H01B 7/32* (2006.01)
*H01B 7/04* (2006.01)

(52) U.S. Cl.
CPC .............. *H01B 7/328* (2013.01); *G02B 6/4417* (2013.01); *G02B 6/4432* (2013.01); *H01B 7/041* (2013.01)

(58) Field of Classification Search
USPC ......................................... 385/101, 103, 107
See application file for complete search history.

(56) References Cited

U.S. PATENT DOCUMENTS

| | | | |
|---|---|---|---|
| 5,343,549 A * | 8/1994 | Nave et al. ..................... | 385/103 |
| 6,349,161 B1 * | 2/2002 | Gleason et al. ............... | 385/113 |
| 2004/0240808 A1 * | 12/2004 | Rhoney et al. ................ | 385/100 |
| 2011/0268398 A1 * | 11/2011 | Quinn et al. .................. | 385/100 |

* cited by examiner

*Primary Examiner* — Eric Wong
(74) *Attorney, Agent, or Firm* — Sherr & Jiang, PLLC

(57) ABSTRACT

The present invention relates to an optical fiber composite cable. The optical fiber composite cable includes at least one power line to transmit power and an optical cable to monitor a state of the power lines, and the optical cable comprises optical fibers, tubes to accommodate the optical fibers, and a protection member to surround the tubes.

8 Claims, 4 Drawing Sheets

OPTICAL FIBER COMPOSITE CABLE

CROSS REFERENCE TO RELATED APPLICATION

This application claims the benefit of the Patent Korean Application No. 10-2013-0023143, filed on Mar. 5, 2013, which is hereby incorporated by reference as if fully set forth herein.

BACKGROUND OF THE DISCLOSURE

1. Field of the Disclosure

The present invention relates to an optical fiber composite cable and, more particularly, to an optical fiber composite cable capable of protecting optical cables when various types of external force, such as bending and tension, works in the optical fiber composite cable including optical cables.

2. Discussion of the Related Art

Recently, the quantity of export goods transported over harbors, such as industrial products including energy resources and vehicles, continues to increase. As measures for an increase in the quantity of export goods transported, a demand for the investment of home and foreign harbor crane equipment and the construction of new harbors continues to increase. In operating this harbor crane equipment, a cable for transferring power and/or electric signals plays the most important role. The cable is continuously used and consumed in the movement of a harbor crane and loading and unloading tasks. In terms of the characteristics of a harbor crane, a high-quality/high-durability cable capable of being used relatively in the long period is necessary because the cable continues to be consumed and needs to be maintained. Furthermore, there is an increasing need for a cheap cable in order to reduce a loss due to occasional damage attributable to an unskilled worker or other reasons.

A harbor cable used in a harbor crane can be basically classified into three types depending on the type. The three types of cables include a reel type cable for supplying power to the entire crane according to a movement of the entire crane, a Festoon type cable hung in a parabola form in such a way as to perform horizontal and straight-line motions according to freight that moves between a ship at anchor and a dock, and a spreader type cable coupled with a part that moves up and down in order to fix freight.

In particular, the reel type cable needs not to be damaged or broken must have high durability enough to supply power although a reel installed in a crane body is repeatedly wound and released. Furthermore, the reel type cable must have an excellent bending characteristic in which the reel type cable can withstand bending stress, such as forward bending/reverse bending, when the reel type cable is wound on the reel or depending on the position of a guide roller, an excellent characteristic related to torsion occurring because the traveling direction of a crane and the angle of a wheel is a right angle, and an excellent characteristic regarding flexibility that is common to cables classified as movable cable. The reel type cable must be designed to satisfy the characteristics stably in the long term.

The reel type cable can be basically divided into an optical fiber composite cable including optical cables and a cable for only supplying power without a optical cable. Here, the optical fiber composite cable requires a high level of structural design technology because a reduction in the performance of a optical cable that may occur from the structural design stage of the optical fiber composite cable to a process of manufacturing the optical fiber composite cable must be minimized, unlike a cable for supplying power without a optical cable. An optical cable applied to an existing optical fiber composite cable uses a relatively expensive optical fiber composite cable because it is relatively weak in design technology. Furthermore, the optical cable is broken in a short period of time, or the optical cable frequently does not use a state monitoring function using an optical cable, that is, the original object of the optical fiber composite cable.

The biggest obstacles to the cable structure design and the selection of materials for improving the above-described problems include tension continuously applied to the entire cable manufacturing process, frequent bending inevitably occurring in the manufacturing process, bending stress applied to the cable due to the radius of curvature, the damage and breakdown of a optical cable attributable to relatively high pressure or heat, and an optical loss resulting from the tension, frequent bending, bending stress, and damage and breakdown. In order to prevent this optical loss, process conditions need to be optimized, but more importantly, it is necessary to secure structural design technology in which an optical loss can be minimized even in severe process conditions.

SUMMARY OF THE DISCLOSURE

The present invention has been made keeping in mind the above problems occurring in the prior art, and an object of the present invention is to provide an optical fiber composite cable including an at least one optical cable, which is capable of preventing an optical loss of a optical cable due to high-temperature and high-pressure environments, continuous tension, and bending stress that are applied to the optical fiber composite cable when manufacturing the optical fiber composite cable and various types of bending stress, torsion stress, and tensile force that are applied to the optical fiber composite cable when using the optical fiber composite cable. That is, an object of the present invention is to provide an optical fiber composite cable having an optical cable structure, which is capable of preventing an optical loss in a process of manufacturing and using the optical fiber composite cable by providing the optical cable structure capable of withstanding environments occurring in cable manufacturing processes as well as a process of using the optical fiber composite cable.

In order to achieve the object, an optical fiber composite cable, comprises at least one power line to transmit power and an optical cable to monitor a state of the power line, wherein the optical cable comprises optical fibers, tubes to accommodate the optical fibers, and a protection member to surround the tubes.

Furthermore, the protection member is made of an aromatic polyamide fiber. Preferably, the protection member is made of an aramid fiber.

In the optical fiber composite cable, the tube is configured to be wound at a first pitch, and the protection member is configured to surround the tubes at a second pitch greater than the first pitch, or the tube is configured to be wound at a first pitch angle, and the protection member is configured to surround the tubes at a second pitch angle smaller than a first pitch angle.

For example, the protection member's thickness is 1.0~4.0 mm.

The optical fiber composite cable further comprises ground wires, wherein a total number of the ground wires and the optical cable corresponds to a number of the power lines. Therefore, the ground wires and the optical cable are disposed symmetrically with respective the power lines.

Furthermore, the optical fiber composite cable further comprises a taping on an outer circumference of the protection member. The taping is made of non-woven fabric or polyethylene phthalate (PET).

DESCRIPTION OF SPECIFIC EMBODIMENTS

Hereinafter, an optical fiber composite cable in accordance with various embodiments of the present invention is described in detail.

Figure 1:
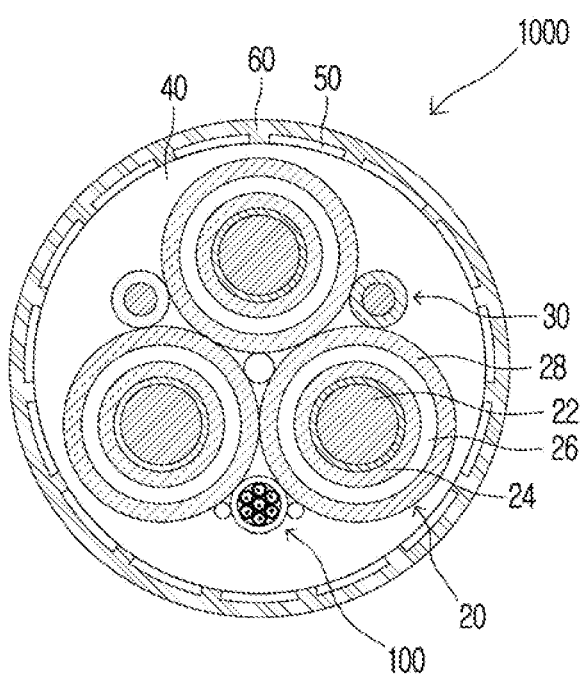
FIG. 1 is a cross-sectional view showing the internal construction of a harbor cable including optical cables.

FIG. 1 is a cross-sectional view showing the internal construction of an optical fiber composite cable 1000 including optical cables in accordance with an embodiment of the present invention.

Referring to FIG. 1, the optical fiber composite cable 1000 includes at least one power lines 20 for transmitting power and at least one optical cable 100 for monitoring the state of the power lines 20. That is, the optical fiber composite cable 1000 includes the optical cable including an optical fiber and has a hybrid fiber optic type cable capable of monitoring the state of the cable.

The optical fiber composite cable 1000 is configured to include the optical cable 100 in such a way as to monitor the state of the optical fiber composite cable 1000.

Figure 2:
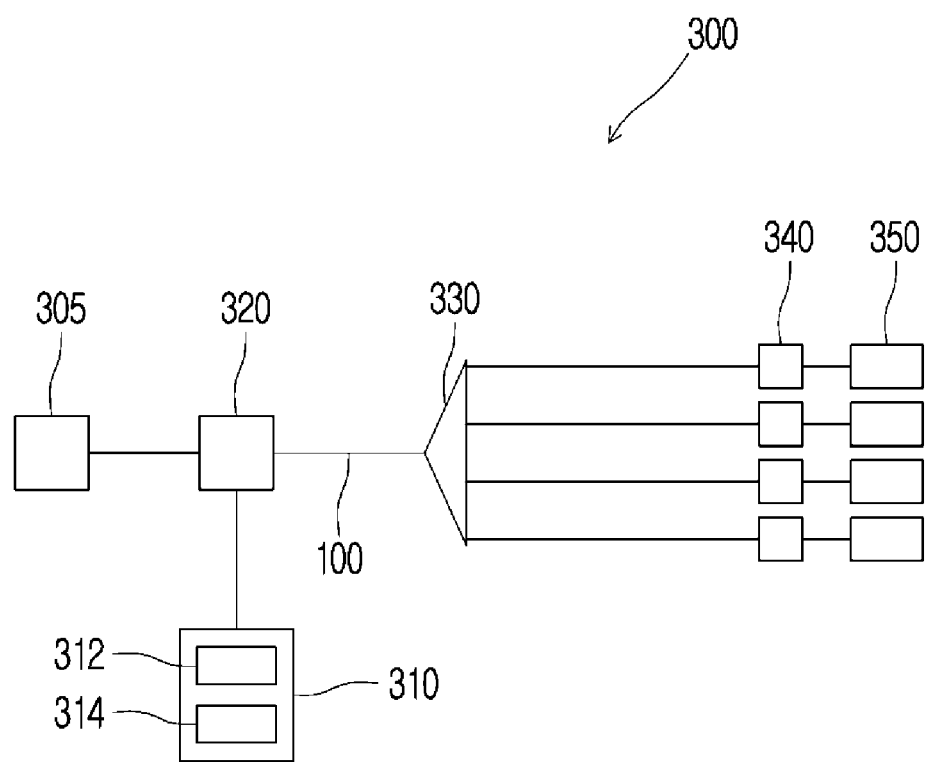
FIG. 2 is a schematic diagram showing the construction of a monitoring system for an optical fiber composite cable.

FIG. 2 is a schematic diagram showing the construction of a monitoring system 300 for monitoring the optical fiber composite cable 1000.

Referring to FIG. 2, the monitoring system 300 includes the optical fiber composite cable 1000 configured to include at least one optical cable 100 and a monitoring device 310 to transmit monitoring light upon the optical cable 100 and receive the reflected monitoring light and monitor the optical fiber composite cable 1000. The monitoring system 300 can further include a coupler 320 for selectively coupling the optical cable 100 and the monitoring device 310 and a splitter 330 for splitting the optical fiber composite cable 1000 so that the optical fiber composite cable 1000 is coupled with a plurality of devices. In FIG. 2, reference numeral '305' may correspond to a transmission device for transmitting power through the optical fiber composite cable 1000, and reference numeral '350' may correspond to various types of elements of crane equipment that is coupled with the optical fiber composite cable 1000 and configured to receive power therefrom.

More particularly, the monitoring device 310 can include an Optical Time Domain Reflectometery (OTDR) 312 for transmitting monitoring light upon the optical cable 100 and receiving the reflected monitoring light and an analyzer 314 for analyzing the waveform of the reflected monitoring light.

The OTDR 312 generates monitoring light having a specific wavelength, transmits the generated monitoring light upon the optical cable 100, and receives the amount of light that is reflected and/or scattered at each point in the length direction of the optical cable 100. Accordingly, the analyzer 314 can analyze a distance distribution of the reflected monitoring light and measure the distance up to a point where the optical cable 100 has been damaged based on a result of the analysis.

More particularly, the OTDR 312 is connected to the optical cable 100 through the coupler 320. For example, the OTDR 312 can be connected to each optical cable 100 periodically or can be connected to each optical cable when damage is suspected. Meanwhile, when monitoring light transmitted upon one optical cable 100 is scattered or reflected and received, a peak according to the length of each branched optical cable is shown with a different distance in the OTDR 312. Accordingly, a worker can check the distance of a peak according to each optical cable in the OTDR 312 and know that the peak corresponds to a peak of what optical cable based on the checked distance.

Meanwhile, reflection means for reflecting monitoring light, for example, a reflection filter unit 340 can be provided in the input terminal of each piece of equipment. The reflection filter unit 340 can be included in an optical connector assembly (not shown) for coupling the optical cable 100 and each piece of equipment. If the reflection filter unit 340 is included as described above, a peak signal reflected from the end of the optical cable 100, that is, the input terminal of the crane equipment, is further increased. As a result, a peak can be detected by the OTDR 312 more easily.

Meanwhile, an optical fiber composite cable is recently being widely used in various fields. In particular, the optical fiber composite cable is being widely used in a cable, such as a cable for a harbor crane. A harbor cable used in this harbor crane can be basically classified into three types depending on the type. The three types of harbor cables include a reel type cable for supplying power to the entire crane according to a movement of the entire crane, a Festoon type cable hung in a parabola form in such a way as to perform horizontal and straight-line motions according to freight that moves between a ship at anchor and a dock, and a spreader type cable coupled with a part that moves up and down in order to fix freight.

In particular, the reel type cable needs not to be damaged or broken must have high durability enough to supply power although a reel installed in a crane body is repeatedly wound and released. Furthermore, the reel type cable must have an excellent bending characteristic in which the reel type cable can withstand bending stress, such as forward bending/reverse bending, when the reel type cable is wound on the reel or depending on the position of a guide roller, an excellent characteristic related to torsion occurring because the traveling direction of a crane and the angle of a wheel is a right angle, and an excellent characteristic regarding flexibility that is common to cables classified as movable cable. The reel type cable must be designed to satisfy the characteristics stably in the long term.

The reel type cable can be basically divided into an optical fiber composite cable including only an optical cable and a cable for supplying only power without an optical cable. Hereinafter, in the reel type cable, an optical fiber composite cable including an optical cable is described as an example. It is however to be noted that the contents described in this specification are not limited to a harbor cable and can be applied to all types of optical fiber composite cables including optical cables.

The power line 20 includes a conductor 22 for transmitting power and includes an internal semi-conducting layer 24, an insulating layer 26, and an external semi-conducting layer 28 which are sequentially included along the outer circumference of the power line 20.

The internal semi-conducting layer 24 functions to make uniform a distribution of electric charges on a surface of the conductor and also make uniform an electric field, thereby improving the dielectric strength of the insulating layer 26. Furthermore, the internal semi-conducting layer 24 functions to prevent a corona discharge and ionization by preventing a gap from formed between the conductor 22 and the insulating layer 26. Furthermore, the internal semi-conducting layer 24 also functions to prevent the insulating layer 26 from penetrating into the conductor 22 when a cable is manufactured.

The insulating layer 26 is provided outside the internal semi-conducting layer 24. The insulating layer 26 electrically insulates the conductor 22 from the outside. In general, the insulating layer 26 must have a high breakdown voltage, and have stable insulating performance in the long term. Furthermore, the insulating layer 26 must have a low dielectric loss and have resistance performance against heat, such as heat-resisting property. Accordingly, the insulating layer 26 can be made of raw materials, such as cross-linked polyethylene (XLPE).

If both the inside and outside of the insulating layer 26 are not shielded, however, some of an electric field is absorbed by the insulating layer 26, but most of the electric field is discharged externally. In this case, if the electric field becomes a specific value or higher, the insulating layer 26 and the jacket of the cable can be broken by the electric field. In order to prevent this problem, a semi-conducting layer is provided on the outside of the insulating layer 26, and the semi-conducting layer is defined as the external semi-conducting layer 28 in order to distinguish the semi-conducting layer provided on the outside of the insulating layer 26 from the internal semi-conducting layer 24. As a result, the external semi-conducting layer 28 functions to make a gap between the external semi-conducting layer 28 and the internal semi-conducting layer 24 have an equal distribution of an electric flux, thereby improving the dielectric strength of the insulating layer 26.

If a plurality of, for example, three power lines 20 are included as shown in FIG. 1, the power lines 20 are associated with each other by a bedding 40, thus forming one set. The bedding 40 is provided on the outer circumference of the power lines by way of a method, such as extrusion.

A jacket 60 is provided on the outermost side of the optical fiber composite cable 1000, and a sheath 50 can be provided on the inside of the jacket 60. The jacket 60 is provided on the outermost side of the optical fiber composite cable 1000 thus functioning to protect the internal construction of the optical fiber composite cable 1000. Accordingly, the jacket 60 has excellent weatherproof properties capable of withstanding natural environments including various types of climates, such as light, wind and rain, moisture, and air, excellent chemical-resistant properties capable of withstanding medicines, such as chemicals, and excellent mechanical strength properties. In general, the jacket 60 is made of polyvinyl chloride (PVC) or polyethylene (PE).

In the optical fiber composite cable 1000 including the optical cable 100, it is important to reduce an optical loss of an optical fiber. In particular, it is important to reduce an optical loss when using and manufacturing the optical fiber composite cable 1000. That is, when manufacturing the optical fiber composite cable, an optical loss can be generated in an optical fiber due to tension and high-temperature and high-pressure environments which work on the optical cable 100. Furthermore, when using the optical fiber composite cable, an optical loss can be generated in an optical fiber due to bending stress, tensile force, and torsion stress that are repeatedly applied.

In order to prevent the optical losses, a protection member for protecting the optical cable 100 needs to be checked from a viewpoint of the materials and structure of the protection member. From a viewpoint of the materials of the protection member, it is necessary to select a protection member which can protect the optical cable 100 in high-temperature and high-pressure environments and does not apply any external force to the optical cable 100 when external force is applied to the optical fiber composite cable 1000. Furthermore, from a viewpoint of the structure of the protection member, it is necessary to select a structure capable of absorbing external tensile force before the tensile force is delivered to the optical cable 100 when the optical fiber composite cable 1000 is used or the tensile force works on the optical fiber composite cable 1000.

Figure 3:
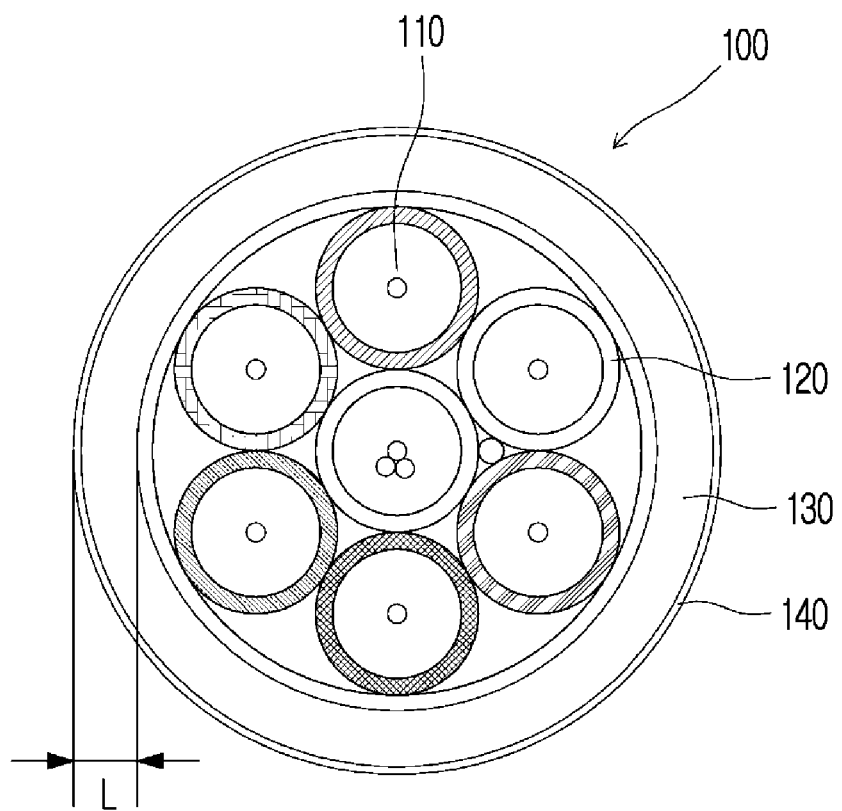
FIG. 3 is an extended view of part of the optical cable shown in FIG. 1.

FIG. 3 is an extended view of part of the optical cable 100 shown in FIG. 1.

Referring to FIG. 3, the optical fiber composite cable includes the optical cable 100. The optical cable 100 can include optical fibers 110, tubes 120 for accommodating the optical fibers 110, and a protection member 130 for surrounding the tubes 120.

The optical cable includes at least one tube 120, and the optical fiber 100 is provided within each of the tubes 120. The plurality of tubes 120 is wound together at specific first pitches.

The protection member 130 can be made of an aromatic polyamide fiber, preferably, an aramid fiber. Aromatic polyamide is polyamide having an aromatic ring within a main chain. Aromatic polyamide includes an aromatic ring and thus has low flexibility and a high melting-point property. In particular, polyamide has a very high melting-point characteristic because it has an intermolecular bond of a hydrogen bond. From among aromatic polyamide fibers, an aramid fiber has excellent tension strength, tenacity, and heat-resisting properties and has high strength and high elasticity. Accordingly, if the protection member 130 is made of an aromatic polyamide fiber including an aramid fiber, a change in the weight and diameter of the optical fiber composite cable 1000 can be minimized and the optical fibers of the optical cable 100 can also be effectively protected. In particular, when the bedding 40 of the optical fiber composite cable 1000 is extruded, the bedding 40 is extruded in high-temperature and high-pressure environments. In this case, if the protection member 130 of the optical cable 100 is made of an aramid fiber having an excellent heat-resisting property, the protection member 130 can be prevented from being burnt or molten.

The protection member 130 is configured to surround the outer circumference of the tube 120 of the optical cable 100. If the tubes 120 of the optical cable 100 are disposed as described above, the tubes are wound together at specific pitches and this structure is increased by way of specific pitches when tensile force is applied to the optical cable 100. Accordingly, when tension stress acts on the optical cable 100, a protection member does not need to be disposed in the center of the optical cable 100. For example, if the protection member 130 has a pitch greater than the pitch of the tube 120 along the outer circumference of the tube 120, the protection member 130 can sufficiently prevent damage to the conductor before the tubes 120 and the optical fibers 110 are extended by the action of tensile force. For this reason, the optical cable 100 includes the protection member 130. Furthermore, the protection member 130 is configured to have a second pitch P2 (refer to FIG. 4) greater than a first pitch P1 (refer to FIG. 4) of the tube 120 along the outer circumference of the tube 120 of the optical cable 100.

Meanwhile, if the protection member 130 is provided along the outer circumference of the tubes 120 as described above, a taping 140 can be further provided on the outer circumference of the protection member 130. The reason why the taping 140 is provided is that the protection member 130 may be extended or deformed in subsequent processes because the second pitch P2 of the protection member 130 is greater than the first pitch P1 of the tube 120. In order to prevent this problem, the taping 140 made of, for example, non-woven fabric or polyethylene phthalate (PET) is provided on the outer circumference of the protection member 130 so that the protection member 130 is not damaged even in high-temperature and high-pressure environments and the structure of the protection member 130 can be maintained.

Figure 4:
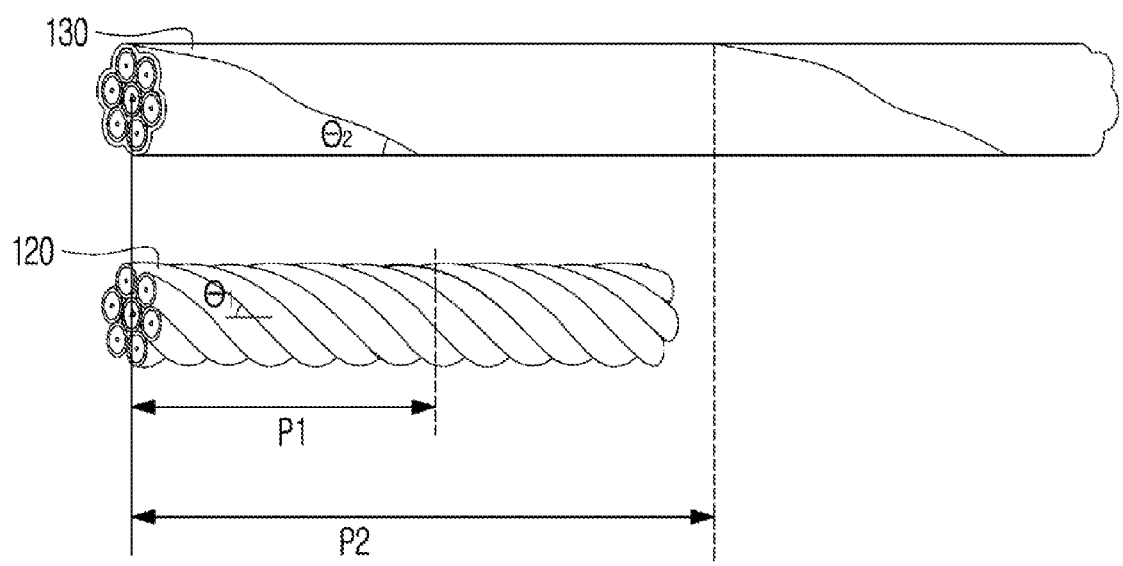
FIG. 4 is a schematic diagram showing a comparison between the tube and the protection member of the optical cable.

FIG. 4 is a schematic diagram showing a comparison between the pitches of the tube 120 and the protection member 130 of the optical cable 110.

Referring to FIG. 4, the second pitch P2 of the protection member 130 of the optical cable 100 is longer than the first pitch P1 of the tube 120. That is, the second pitch P2 of the protection member 130 can be determined to be greater than the first pitch P1 of the tube 120. Furthermore, a second pitch angle θ2 of the protection member 130 can be defined as being smaller than a first pitch angle θ1 of the tube 120. That is, when the protection member 130 is wound while forming a specific second pitch P2, the second pitch angle θ2 that is formed along with a horizontal line can be smaller than the first pitch angle θ1 of the tube 120.

As a result, in the present embodiment, the protection member 130 is provided on the outer circumference of the tube 120 of the optical cable 100. In this case, as described above, resisting force to the tensile force of the tube 120 can be sufficiently increased even when the protection member 130 is provided on the outer circumference of the tube 120. Furthermore, when fabricating the optical cable 100, it is advantageous to provide the protection member 130 on the outer circumference of the tube 120 as compared with a case where the protection member 130 is provided within the tube 120. In particular, in the present embodiment, since the protection member 130 is configured to have the second pitch P2 greater than the first pitch P1 of the tube 120, the protection member 130 absorbs tensile force attributable to the deformation of the protection member 130 that occurs before the tube 120 is deformed by the tensile force, thereby being capable of preventing damage to the tube 120 and optical fiber 110.

If the protection member 130 is wound on the outer circumference of the tube 120 at a specific second pitch P2, the protection member 130 can have a thickness L (refer to FIG. 3) of about 1.0 mm~4.0 mm, preferably, 1.5 mm~3.5 mm. If the thickness L of the protection member 130 is greater than the above-mentioned thickness range, a total diameter of the optical fiber composite cable 1000 can be increased by an extended diameter of the optical cable 100 when the protection member 130 is combined with the optical cable 100 and the power lines 20. In contrast, if the thickness L of the protection member 130 is smaller than the above-mentioned thickness range, the protection member 130 may not sufficiently protect the internal tube 120 and the optical fiber 110 when external force is applied to the protection member.

Referring back to FIG. 1, the optical fiber composite cable 1000 can further include a ground wire 30. In this case, the total number of ground wires 30 and the optical cable 100 can correspond to the number of power lines 20 in order to symmetrically dispose the internal elements of the optical fiber composite cable 1000. That is, for example, if three power lines 20 and one optical cable 100 are included in the optical fiber composite cable 1000 as in FIG. 1, two ground wires 30 are included so that each of the ground wires 30 and the optical cable 100 is disposed between the power lines 20. Although the ground wires 30 and the optical cable 100 may not form a perfect symmetrical structure due to different diameters and weight, the ground wires 30 and the optical cable 100 can be disposed symmetrically with respect to the power lines 20.

The inventor of the present invention performed experiments in order to compare the optical cable according to the present invention with a conventional optical cable in terms of optical loss performance. Table 1 below shows average optical loss performance obtained by the experiments.

TABLE 1

|  | 850 nm | 1300 nm |
| --- | --- | --- |
| Reference value (db/km) | 3.50 | 1.00 |
| Embodiment (db/km) | 2.09 | 0.605 |
| Comparison Example 1 (db/km) | 3.80 | 1.90 |
| Comparison Example 2 (db/km) | 3.40 | 1.40 |

In Table 1, 'Embodiment' is defined as the optical fiber composite cable including the protection member made of an aramid fiber according to the present invention. In this case, the optical fiber composite cable may include three power lines, two ground wires, and one optical cable, the optical cable may include six tubes having a pitch of 70 mm and the protection member having a pitch of 120 mm, and the optical fiber composite cable 1000 was made in high-temperature/high-pressure environments and configured to have a diameter of about 45 mm. In contrast, each of 'Comparison Example 1' and 'Comparison example 2' does not include the protection member in the optical cable unlike Embodiment. Comparison Example 1 is fabricated in high-temperature/high-pressure environments without the protection member, and Comparison Example 2 is fabricated in relatively low-temperature/low-pressure environments without the protection member.

Table 1 showed that when monitoring light of 850 nm and monitoring light of 1300 nm are transmitted to and received from the optical cables according to Embodiment and Comparison Examples 1 and 2 and average optical losses are measured by the OTDR, reference optical losses of 850 nm and 1300 nm are about 3.50 dB/km and 1.00 dB/km respectively. That is, if an average optical loss is measured using the monitoring light of 850 nm, the stability of the optical cable can be satisfied when the measured average optical loss is about 3.50 dB/km or less. If an average optical loss is measured using the monitoring light of 1300 nm, the stability of the optical cable can be satisfied when the measured average optical loss is about 1.00 dB/km or less.

From Table 1, it can be seen that Embodiment satisfies the stability of the optical cable because average optical losses measured for the monitoring light of 850 nm and 1300 nm are 2.09 dB/km and 0.605 dB/km, respectively, which are the reference value or lower.

In contrast, it can be seen that Comparison Example 1 had a defect in the optical cable because average optical losses measured for the monitoring light of 850 nm and 1300 nm are 3.80 dB/km and 1.90 dB/km, which exceed the reference value. This is because the tube and optical fiber of the optical cable are severely pressurized by the bedding under high-temperature/high-pressure extrusion conditions. Meanwhile, in the case of Comparison Example 2, average optical losses measured for the monitoring light of 850 nm and 1300 nm are 3.40 dB/km and 1.40 dB/km, respectively, which exceed the reference value in 1300 nm, but does not exceed the reference value in 850 nm. However, it can be seen that Comparison Example 2 had a defect in the optical cable in the case of 850 nm because a plurality of average optical losses can exceed the reference value by taking the standard deviation of the optical loss into consideration. As a result, Comparison Example 2 is manufactured in relatively low-temperature/low-pressure environments, but if the bedding is extruded, the bedding penetrates into the space between the power lines and thus pressurizes the power lines. Accordingly, Comparison Example 2 has a defect, such as that described above, because the power lines pressurize the optical cable.

In accordance with the optical fiber composite cable having the above-described structure according to the present invention, since the optical cable includes the protection member made of an aramid fiber, an optical loss of the optical cable can be minimized even in high-temperature and high-pressure environments, continuous tension, and bending stress that are applied to the optical cable when manufacturing the optical cable. Furthermore, workability and productivity can be improved because a manufacturing process is possible in high-temperature and high-pressure environments.

In particular, when manufacturing the optical cable if the ground wires and the optical cable are included in response to the power lines of the optical fiber composite cable, a manufacturing process can be simplified because the optical cable is manufactured by applying the same tension as that applied to the ground wires and thus productivity can be improved because the optical cable can be manufactured in a shorter time. Furthermore, torsion can be prevented from occurring in the optical cable when using the optical fiber composite cable subsequently because the ground wires and the optical cable included in the optical fiber composite cable keep their balance.

Furthermore, the protection member is configured to have a pitch greater than the pitch of the tube. Accordingly, when external tensile force is applied to the optical fiber composite cable, the tensile force can be prevented from being directly delivered to the optical fiber of the optical cable because the tensile force first acts on the protection member. Accordingly, the optical fiber composite cable can be used for a long period of time because an optical loss of the optical cable is prevented.

Furthermore, if the protection member is included as in the present invention, conditions for subsequent processes can be determined more flexibly because there is no danger of damage to the optical cable due to the protection member itself although a high-temperature and high-pressure process is performed.

Furthermore, the optical fiber composite cable according to the present invention has almost the same outer diameter as an existing optical cable having a sheath made of polymer, but the optical fiber composite cable does not experience a reduction in productivity and characteristics occurring because a high-temperature and high-pressure process is not utilized owing to problems inherent in the existing optical cable.

Furthermore, the optical fiber composite cable of the present invention can prevent an optical loss attributable to deformation or pressing that can occur when a high temperature/high pressure process is used. Furthermore, there is an advantage in that distortion occurring when using the optical fiber composite cable for a long period of time can be prevented because the same tension can be applied to the optical cable and the ground wires in an assembly process.

Although the exemplary embodiments of the present invention have been described above, those skilled in the art will appreciate that the present invention can be modified and changed in various ways without departing from the spirit and scope of the present invention which are written in the claims below. Accordingly, any modified implementation can be considered to be included in the technical category of the present invention as long as the modified implementation basically falls within the claims of the present invention.

What is claimed is:

1. A optical fiber composite cable, comprising:
   at least one power line which transmits electric power; and
   an optical cable to monitor a state of the power line,
   wherein the optical cable comprises optical fibers, tubes which accommodate the optical fibers, and a protection member which surrounds the tubes,
   wherein the tubes are wound at a first pitch and the protection member is wound at a second pitch greater than the first pitch,
   wherein the tubes are wound at a first pitch angle and the protection member surrounds the tubes at a second pitch angle smaller than the first pitch angle,
   wherein the protection member's thickness is 1.0~4.0 mm.

2. The optical fiber composite cable of claim 1, wherein the protection member is made of an aromatic polyamide fiber.

3. The optical fiber composite cable of claim 1, wherein the protection member is made of an aramid fiber.

4. The optical fiber composite cable of claim 1, further comprising ground wires, wherein a total number of the ground wires and the optical cable corresponds to a number of the power lines.

5. The optical fiber composite cable of claim 4, wherein the ground wires and the optical cable are disposed symmetrically with respective the power lines.

6. The optical fiber composite cable of claim 1, further comprising a taping on an outer circumference of the protection member.

7. The optical fiber composite cable of claim 6, wherein the taping is made of non-woven fabric or polyethylene phthalate (PET).

8. The optical fiber composite cable of claim 1, wherein the at least one power line is arranged at an outside of the optical cable and within the optical fiber composite cable.

* * * * *